UNITED STATES PATENT OFFICE.

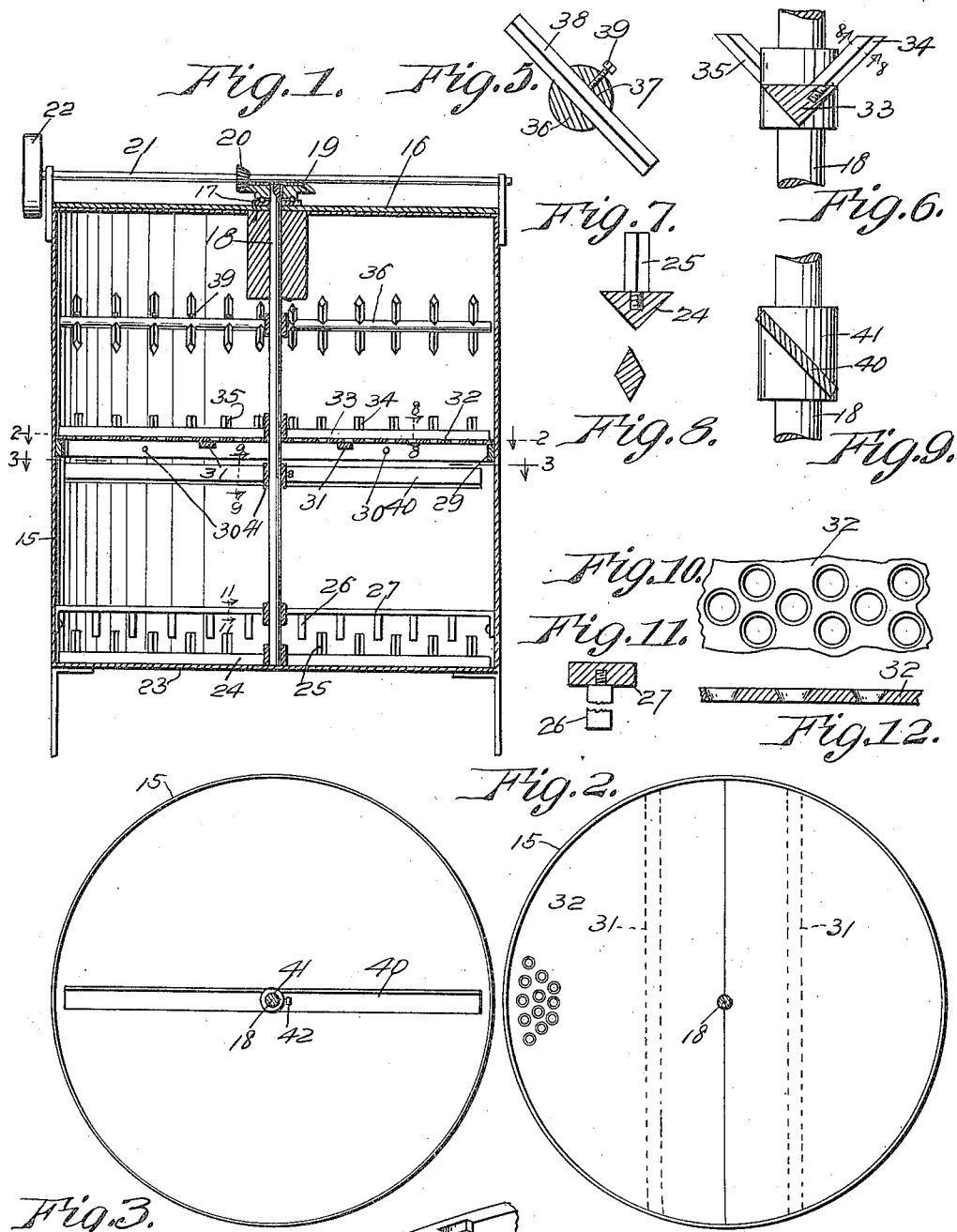

HOWARD G. LAKENAN, OF OPEQUON, VIRGINIA.

MIXING APPARATUS.

1,157,788. Specification of Letters Patent. Patented Oct. 26, 1915.

Application filed November 14, 1914. Serial No. 872,171.

*To all whom it may concern:*

Be it known that I, HOWARD G. LAKENAN, a citizen of the United States of America, and resident of Opequon, in the county of Frederick and State of Virginia, have invented certain new and useful Improvements in Mixing Apparatus, of which the following is a specification.

This invention relates to apparatus for making solutions which are primarily designed for use as the basis of sprays for fruit trees and other vegetation, the said invention being particularly used in producing a solution of sulfur and lime in such proportions as will, when intermingled and treated with water, produce an effective spray for vegetation.

An object of this invention is to provide novel means for commingling the lime and sulfur and for subjecting the same to the action of water, it having been found in practice that the most desirable results are attained by subjecting the apparatus to heat so that the materials treated therein will more quickly and effectively combine to produce the solution.

A still further object of this invention is to provide an apertured plate having a novel construction, whereby clogging of the apertures will be prevented while the stirrer is in motion as the stirrer will serve to remove or dislodge material from the said apertures.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a vertical sectional view of an apparatus embodying the invention; Fig. 2 illustrates a sectional view on the line 2—2 of Fig. 1; Fig. 3 illustrates a sectional view on the line 3—3 of Fig. 1; Fig. 4 illustrates a perspective view of a plate holding ring; Fig. 5 illustrates a sectional view of one of the shafts showing a stirrer in elevation; Fig. 6 illustrates a sectional view of a combined scraper and agitator; Fig. 7 illustrates a sectional view of a stirrer bar with a tooth in elevation; Fig. 8 illustrates a sectional view on the line 8—8 of Fig. 1; Fig. 9 illustrates a sectional view on the line 9—9 of Fig. 1; Fig. 10 illustrates a plan view of a fragment of the apertured plate; Fig. 11 illustrates a sectional view of a stirrer on the line 11—11 of Fig. 1; and Fig. 12 illustrates a sectional view of the apertured plate shown in Fig. 10.

In these drawings 15 denotes a casing which is preferably cylindrical, the same having any appropriate cover or lid 16 by which access may be had to the interior for the delivery of water and the material, such as lime and sulfur. The cover 16 supports a bearing block 17 in which a vertically disposed shaft 18 is rotatable and the upper end of the said shaft has a gear wheel 19 driven by a pinion 20. The pinion 20 is mounted on the shaft 21 and the shaft is driven by any suitable power, which may be applied to the wheel 22 on the said shaft. By reason of the elements just described, it is apparent that the vertically disposed shaft 18 may be driven to suit the requirements in practice.

The casing 15 is intended to be supported in association with a furnace or other heating medium by which the contents of the said receptacle may be heated to a proper degree to insure proper action of the water on the chemicals which are supplied to the apparatus. The casing 15 has a bottom 23 on which a stirrer 24 travels, the said stirrer being connected to the vertically disposed shaft 18. The stirrer 24 has teeth 25 which travel between the downwardly extending teeth 26 which project from the bar 27, the said bar 27 being secured to the wall of the receptacle 15. The purpose of the teeth 25 and 26 is to crush or disintegrate the lime or sulfur, so that the water within the receptacle may more readily saturate the chemicals and be impregnated therewith.

Intermediate the height of the receptacle 15 is a supporting ring 29 and the said ring may be secured to the receptacle in any appropriate way as by fastenings 30. The ring 29 acts as a support for the bars 31 and the said bars and ring constitute supports for the apertured plate 32, it being seen from an inspection of the drawings, that the walls of the apertures taper from the upper to the lower sides of the said plate and form tapered seats. The purpose of this construction is to permit the removal of material which would otherwise lodge in and clog the said apertures, it being apparent that the said material if struck by a moving object would ride up the inclined surfaces of the walls of the apertures and be carried by the openings.

As a means for agitating the material and dislodging it from the apertures, the shaft 18 is provided with a bar 33, which is V-shaped in cross section, the lower edge of the said bar being positioned so that it will move in contact with the upper surface of the apertured plate, and the said bar is furthermore provided with fingers 34 and 35, which project from the upper surface of the bar but in opposite directions from the edges thereof so that the bar and fingers when rotated will effectually disintegrate and agitate the combined lime and sulfur and subject it to the action of water or fluid which is forced through the apertures of the plate in a manner to be presently explained.

As shown in the drawings, the fingers 34 and 35 and the teeth 25 and 26 are provided with shanks which are threaded in their respective bars, and by reason of this construction, the said fingers and teeth may be readily applied to or removed from their respective members, facilitating the renewal of worn or broken members and otherwise adding to the simplicity of the structure and its maintenance.

It has been found in practice that when the liquid and chemicals are moved, there is a certain amount of froth and in order to break up this froth and prevent the contents of the receptacle from boiling over, stirrers or agitators are provided near the top of the said receptacle. The manner of producing this effect or result is shown in Fig. 1 of the drawings and it consists of a rod or bar 36 with apertures 37 therein, the said apertures having fingers 38 secured therein by the set screws 39. As shown in the drawings, the fingers on one side of the shaft 18 are at right angles to those at the other side of the shaft so that when the said shaft is rotated, these fingers will be forced through the froth, preventing its retaining the heat to such an extent as to cause the overboiling of the contents of the receptacle.

The shaft 18 is furthermore provided with liquor displacing blade 40, the said blade having a boss or hub 41 secured to the shaft by a set screw. The blade is set at an angle with relation to the shaft 18 and is at such position with relation to the shaft as to deflect or force the liquid upwardly against the under surface of the plate 32 and through the apertures thereof. It is the purpose of the inventor to have the blade set at such position with relation to the shaft that when the said shaft is rotated in a clockwise direction, one blade will force liquid upward whereas the blade on the opposite side of the shaft will operate to create a partial vacuum and sufficient suction to clear the apertures in the plate and aid in the circulation of the fluid through the said apertures.

I claim:

1. In an apparatus for mixing lime and sulfur with water, means for disintegrating sulfur and lime including a shaft, means for operating the disintegrating means, an apertured plate intermediate the height of the receptacle, a water forcing blade carried by the shaft below the apertured plate, a stirrer bar V-shaped in cross section secured to the shaft above the said apertured plate, and means for rotating the shaft.

2. In an apparatus for mixing lime and sulfur, with water, means for disintegrating sulfur and lime including a shaft, means for operating the disintegrating means, an apertured plate intermediate the height of the receptacle, a water forcing blade carried by the shaft below the apertured plate, a stirrer bar V shaped in cross section secured to the shaft above the said apertured plate, a froth agitator carried by the said shaft, and means for rotating the shaft.

3. In an apparatus for mixing water with lime and sulfur, a receptacle, an apertured plate in the receptacle intermediate its height, a shaft rotatably mounted in the said receptacle, a liquid deflecting blade on the said shaft under the apertured plate, said deflecting means being effective to force liquid upwardly on one side of the said shaft and to force it downwardly on the other side of said shaft, whereby a suction is created for freeing the apertures of the plate, a stirrer carried by the said shaft above the said apertured plate and in contact therewith, and means for rotating the shaft.

4. In an apparatus for mixing water with lime and sulfur, a receptacle, an apertured plate, the apertures of which are tapered downwardly, in the receptacle, intermediate its height, a shaft rotatably mounted in the said receptacle, a liquid deflecting blade on the said shaft under the apertured plate, said deflecting means being effective to force liquid upwardly on one side of the said shaft and to force it downwardly on the other side of said shaft, whereby a suction is created for freeing the apertures of the plate, a stirrer carried by the said shaft above the said apertured plate and in contact therewith, and means for rotating the shaft.

In testimony whereof, I affix my signature in the presence of two witnesses.

HOWARD G. LAKENAN.

Witnesses:
 M. I. PFEIFER,
 LOTTIE E. BARKLEY.